United States Patent
Gan et al.

(10) Patent No.: US 10,706,316 B2
(45) Date of Patent: Jul. 7, 2020

(54) SYSTEM AND METHOD OF FEATURE DESCRIPTOR PROCESSING

(71) Applicant: QUALCOMM Incorporated, San Diego, CA (US)

(72) Inventors: Kim-Chyan Gan, Sammamish, WA (US); Mao Zeng, Austin, TX (US); Erich Plondke, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 16/144,331

(22) Filed: Sep. 27, 2018

(65) Prior Publication Data
US 2019/0095748 A1    Mar. 28, 2019

Related U.S. Application Data

(60) Provisional application No. 62/564,742, filed on Sep. 28, 2017.

(51) Int. Cl.
| | |
|---|---|
| G06K 9/46 | (2006.01) |
| G06K 9/62 | (2006.01) |
| G06K 9/32 | (2006.01) |
| G06T 1/20 | (2006.01) |
| G06K 9/00 | (2006.01) |

(52) U.S. Cl.
CPC ....... G06K 9/4647 (2013.01); G06K 9/00986 (2013.01); G06K 9/3233 (2013.01); G06K 9/4642 (2013.01); G06K 9/4671 (2013.01); G06K 9/6206 (2013.01); G06T 1/20 (2013.01)

(58) Field of Classification Search
CPC .............. G06K 9/4647; G06K 9/4642; G06K 9/00986; G06K 9/4671; G06K 9/6206; G06K 9/3233; G06T 1/20
See application file for complete search history.

(56) References Cited

U.S. PATENT DOCUMENTS

2016/0225119 A1  8/2016  Xu et al.
2016/0378716 A1  12/2016  Grochowski et al.

OTHER PUBLICATIONS

Anonymous: "Scale-invariant Feature Transform—Wikipedia," Jun. 14, 2019 (Jun. 14, 2016), pp. 1-18, Retrieved from the Internet: URL:https://en.wikipedia.org/wiki/Scale-invariant_feature_transform.
Lowe D., "The SIFT (Scale Invariant Feature Transform) Detector and Descriptor", University of British Columbia, Journal paper IJCV 2004, pp. 1-34.
International Search Report and Written Opinion—PCT/US2018/053481—ISA/EPO—dated Jan. 11, 2019.
"OpenCV's SIFT implementation", GitHub Inc., Oct. 21, 2013, pp. 1-13.

*Primary Examiner* — Minjung Kim
(74) *Attorney, Agent, or Firm* — Moore Intellectual Property Law, PLLC

(57) ABSTRACT

A method of generating a feature descriptor includes determining a first output histogram of an input by processing a first group of pixels of the input to determine first contributions to bins of the first output histogram. The input image including gradient orientation values and gradient magnitude values of a portion of an image that is in a region of a detected feature. After processing the first group of pixels, the method includes determining a second output histogram of the input by processing a second group of pixels of the input to determine second contributions to bins of the second output histogram.

20 Claims, 6 Drawing Sheets

FIG. 2

SYSTEM AND METHOD OF FEATURE DESCRIPTOR PROCESSING

I. CROSS REFERENCE TO RELATED APPLICATIONS

The present application claims the benefit of U.S. Provisional Patent Application No. 62/564,742, entitled "SYSTEM AND METHOD OF FEATURE DESCRIPTOR PROCESSING," filed Sep. 28, 2017, which is expressly incorporated by reference herein in its entirety.

II. FIELD

The present disclosure is generally related to image processing, and more specifically related to image feature descriptor processing.

III. DESCRIPTION OF RELATED ART

Advances in technology have resulted in more powerful computing devices. For example, computing devices, such as laptop and desktop computers and servers, as well as wireless computing devices, such as portable wireless telephones, have improved computing capabilities and are able to perform increasingly complex operations. Increased computing capabilities have also enhanced device capabilities in various other applications. For example, vehicles may include processing devices to enable global positioning system operations or other location operations, self-driving operations, interactive communication and entertainment operations, etc. Other examples include household appliances, security cameras, metering equipment, etc., that also incorporate computing devices to enable enhanced functionality, such as communication between internet-of-things (IoT) devices.

A computing device may process image data, such as data captured by a camera that is coupled to or integrated in the computing device. Features (or keypoints) may be detected within the image based on one or more feature detection processes and compared to stored feature data. For example, features may be detected in an object detection application to determine whether a particular object corresponding to the stored feature data is detected in the image data. Feature detection may include a scale-invariant feature transform (SIFT) computation in which there may be hundreds or thousands (or any other amount) of keypoints detected within an image. To generate a unique fingerprint for each keypoint, the local image region around each keypoint is used to generate a feature descriptor of the keypoint.

Feature descriptors can be computed as histograms, such as a histogram with 128 bins. Although special hardware, such as dedicated hardware for performing histogram or scatter operations, may be implemented to calculate feature descriptors efficiently, such special hardware increases processor cost and size. Alternatively, feature descriptors can be computed using scalar processor architectures to perform histogram or scatter operations at reduced cost but also at reduced speed as compared to using special hardware.

IV. SUMMARY

In a particular aspect, a method of generating a feature descriptor includes determining a first output histogram of an input by processing a first group of pixels of the input to determine first contributions to bins of the first output histogram. The input includes gradient orientation values and gradient magnitude values of a portion of an image that is in a region of a detected feature. The method includes, after processing the first group of pixels, determining a second output histogram of the input by processing a second group of pixels of the input to determine second contributions to bins of the second output histogram.

In another particular aspect, a processor includes a control unit configured to load registers with data of a group of pixels of an input. The group of pixels is selected in accordance with a particular iteration of an iterative feature descriptor operation. The processor includes an execution unit configured to perform vector processing of the data to determine first contributions to bins of an output histogram that is selected in accordance with the particular iteration.

One particular advantage provided by at least one of the disclosed aspects is the ability to generate feature descriptors in a faster and more efficient manner as compared to using conventional techniques using scalar architectures and with lower power and reduced cost as compared to using specialized hardware. The solution enables efficient vectorization of feature descriptor generation using non-specialized vector instructions. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 2 is a diagram illustrating examples of output format shifting that may be performed during generation of a feature descriptor.

VI. DETAILED DESCRIPTION

Figure 1:
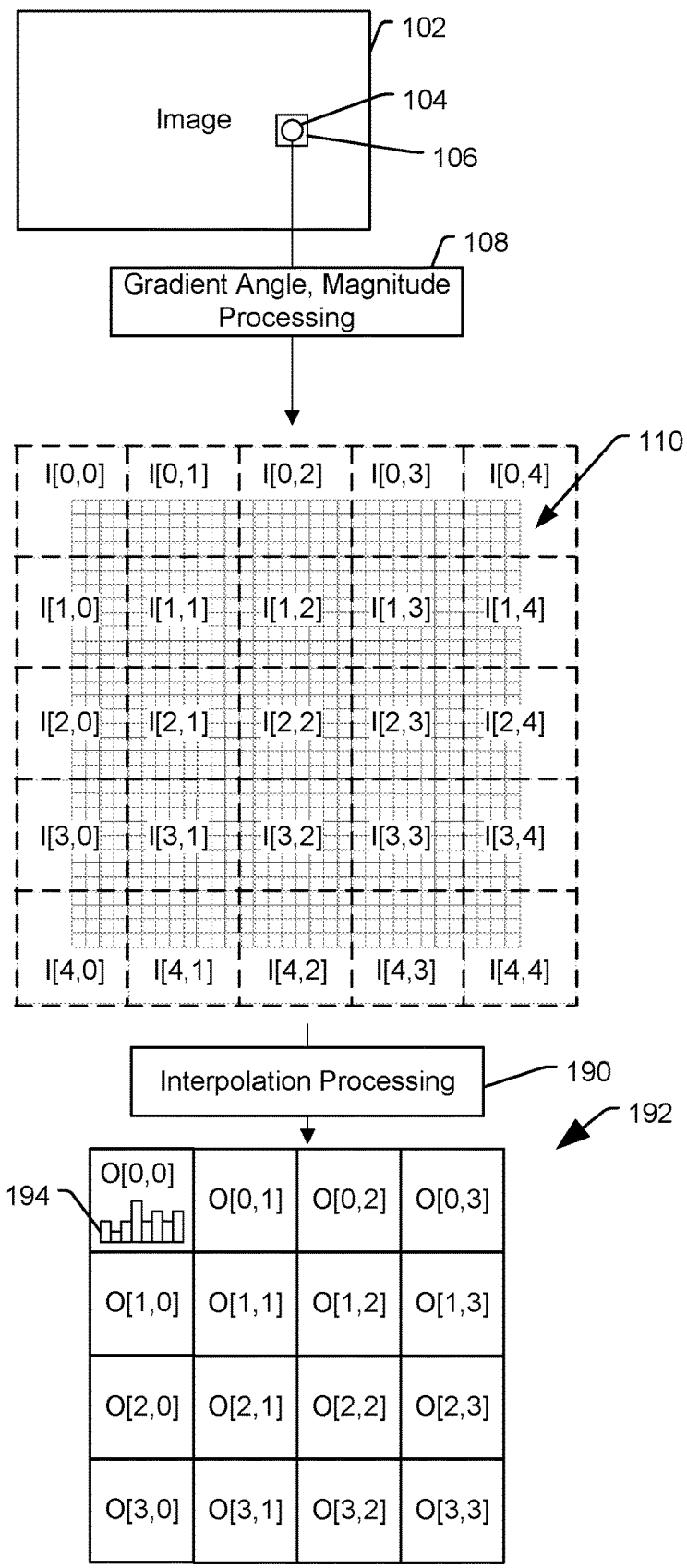
FIG. 1 is a diagram illustrating aspects of feature descriptor processing.

FIG. 1 depicts an example of aspects of feature descriptor processing that may be performed by a vector processor. An image 102 is processed to detect one or more keypoints, such as a representative keypoint 104, and an image portion 106 around the keypoint 104 is processed to generate a feature descriptor. As illustrated, the image portion 106 undergoes processing 108 to determine a gradient angle value (also referred to as a gradient orientation value) and gradient magnitude value, such as an approximate gradient angle value and an approximate gradient magnitude value, for each pixel in the image portion 106 to generate a 32×32 input ("I") 110 (illustrated using solid lines). The input 110 is logically partitioned into 25 regions in a 5×5 array (illustrated using dashed lines). The regions of the input 110 are processed using interpolation processing 190 to generate a 4×4 array of outputs ("O") 192. Each output 192 is generated based on interpolation using four of the input regions. To illustrate, the output O[0,0] is generated as a function of the four input regions I[0,0], I[0,1], I[1,0], and I[1,1], expressed as O[0,0]=F(I[0,0], I[0,1], I[1,0], I[1,1]).

Similarly, O[0,1]=F(I[0,1], I[0,2], I[1,1], I[1,2]), O[0,2]=F (I[0,2], I[0,3], I[1,2], I[1,3]), O[0,3]=F(I[0,3], I[0,4], I[1,3], I[1,4]), etc. Although described in terms of "gradient angle" and "gradient magnitude," in some implementations a "gradient" includes or is determined using one or more approximations (e.g., finite difference approximations, quantization approximations, etc.).

Each output 192 includes an 8-element (or "bin") histogram, such as a representative histogram 194. The 8-bin histograms that are generated for each of the 16 outputs 192 form a 128-value feature descriptor. Although the histogram 194 is graphically depicted in FIG. 1 for purpose of illustration, it should be understood that implementations may not generate graphical representations of histograms of the output 192.

Although specific values are used herein for purpose of explanation, in other implementations other values may be used. For example, the input 110 is sized as M×M, where M is a positive integer and illustrated in FIG. 1 as M=32, although in another implementation M has a value other than 32. The array of outputs 192 is sized as N×N, where N is a positive integer and illustrated in FIG. 1 as N=4, although in another implementation N has a value other than 4. Although the input 110 and the array of outputs 192 are described as square (e.g., M×M or N×N), in other implementations one or both of the input 110 or the array of outputs 192 may not be square (e.g., having dimensions S×T, where S and T are positive integers and S is not equal to T). The histogram for each of the outputs 192 is sized as having K orientation bins, where K is a positive integer and described as K=8, although in another implementation K has a value other than 8.

In the illustrated implementation, the length of an output feature vector is 128 entries (e.g., N*N*K=4×4×8). Each entry of the output feature vector is the weighted sum of the input pixels' gradient magnitude within the 16×16 region (e.g., a 2×2 group of the 8×8 regions in the input 110, such as the group I[0,0], I[0,1], I[1,0], and I[1,1]) that contribute to that entry. A contribution of an input pixel to an entry of the output feature vector is a value of wx*wy*wa*mag, where wx has a value based on a position of the input pixel within the input 110 along an x-coordinate (e.g., a horizontal axis in FIG. 1), wy has a value based on a position of the input pixel within the input 110 along a y-coordinate (e.g., a vertical axis in FIG. 1), wa has a value based on a gradient direction of the input pixel, and mag has a value based on the gradient magnitude of the input pixel. The values wx, wy, and wa represent a trilinear interpolation of the input pixel's gradient magnitude based on x-axis distance, y-axis distance, and orientation bin. The gradient magnitude and weight of an input pixel for an orientation bin (wa) are computed through the gradient magnitude and gradient angle of input pixels. Each of input pixels in the input 110 can contribute to up to 8 values of the output feature vector.

For example, a pixel in I[0,0] contributes to two orientation bins of O[0,0] but does not contribute to adjacent outputs O[0,1] or O[1,0]. For example, if the pixel has a gradient angle of 22.5 degrees, the pixel contributes to the orientation bin representing 0 degrees and to the orientation bin representing 45 degrees in O[0,0], according to a linear interpolation between the two orientation bins. A pixel in I[0,1] contributes to two orientation bins of O[0,0] in addition to contributing to two orientation bins of O[0,1], based on a linear interpolation of the x-position of the pixel between the centers of I[0,0] and I[0,1] and a linear interpolation between the orientation bins as described above. A pixel in I[1,1] contributes to two orientation bins of each of O[0,0], O[0,1], O[1,0], and O[1,1]. In a particular implementation, the contributions of an input pixel to each of 8 bins is expressed as:

$$w(0)=wy*wx*wa*mag;$$

$$w(1)=wy*wx*(1-wa)*mag;$$

$$w(2)=wy*(1-wx)*wa*mag;$$

$$w(3)=wy*(1-wx)*(1-wa)*mag;$$

$$w(4)=(1-wy)*wx*wa*mag;$$

$$w(5)=(1-wy)*wx*(1-wa)*mag;$$

$$w(6)=(1-wy)*(1-wx)*wa*mag;$$

$$w(7)=(1-wy)*(1-wx)*(1-wa)*mag;$$

where "x" corresponds to an x-location of the pixel (e.g., a relative location from the left-most edge of an 8×8 region of the input 110, such as the region I[1,1]), "y" corresponds to a y-location of the pixel (e.g., a relative location from the top-most edge of an 8×8 region of the input 110, such as the region I[1,1]), "a" corresponds to a gradient angle value for the pixel (e.g., an angle in the range from 0 degrees to 360 degrees), "mag" corresponds to a gradient magnitude value for the pixel, and "w" indicates that a value is weighted (and does not necessarily indicate the weighting factor for the value). For example, "wx" indicates a weighted version of the x-location of the pixel and "wa" indicates a weighted version of the pixel's gradient angle value, although the weighting factor applied to the x-location value may not equal the weighting factor applied to the gradient angle value.

For a single input pixel, the pixel can contribute to any of up to 32 bins (2×2×K=2×2×8, i.e., the 8 orientation bins for each of the 4 regions that include the input pixel). In an implementation that calculates the feature descriptor from a "scatter" point of view, each pixel is processed to determine which bins of the output feature vector the pixel contributes to, and its contributions are accumulated into the determined bins of the output feature vector. However, such a scatter approach involves writing multiple output values to various memory locations, which can involve a large number of memory or cache accesses.

However, in a particular aspect, a number of registers used is reduced by reversing the computation; that is, by computing all the data that go into the same output bin. Such a computation may be described as from a "gather" point of view. For a single output (e.g., the 8-bin orientation histogram 194 of O[0,0]), its data comes from up to 256 points (2M/N×2M/N=16×16 pixels of I[0,0], I[0,1], I[1,0], I[1,1]) of a local image region. In contrast to a "histogram" implementation that computes the output feature vector by iterating over the pixels of the input 110 line-by-line, implementations of the present disclosure compute output based on input "tile" of (2M/N×2M/N), such as the 16×16 region I[0,0], I[0,1], I[1,0], I[1,1]. If the tile size is less than a vector size of a processor such that the data of an entire 16×16 region can be loaded into a single vector for vector processing operations, then the output values of the 8 orientation bins for the region are only written once (e.g., to cache), instead of being written multiple times in a scatter implementation. A number of potential output positions into which a result of a pixel computation is to be written is therefore reduced as compared to a scatter implementation, reducing register pressure (although input data may be read multiple times). From a scatter perspective, one input pixel can generate 8 outputs that contribute to any of 32 bins out of 128 total bins of the output feature vector. From a gather perspective, one input pixel (from a 16×16 region of 256 pixels) can contribute to 2 out of 8 bins.

In a particular implementation on a vector processor, the number of read/write operations on the cache/vector-based tightly coupled memory (VTCM) is reduced by 76%. A primary reduction of cache accesses results from reduced writes to memory, where a register is used instead of memory for updating the output. The number of read/write operations on cache/VTCM influences the power efficiency of an implementation.

To illustrate, in a scatter implementation, read operations from cache are approximated as 32 pixels×32 pixels×1 iteration (32×32=1,024), and write operations to cache are approximated as 32 pixels×32 pixels×8 output values (32×32×8=8,192). In a gather implementation, read operations from cache are approximated as 32 pixels×32 pixels×4 iterations (e.g., each pixel is in 4 regions and is therefore read 4 times, 32×32×4=4,096), and write operations to cache are approximated 128 output values×1 iteration (assuming caching is performed in registers).

In a particular aspect, additional performance gain is achieved by reducing a number of compare and multiplex ("mux") operations. For each output, there are 8 possible orientation bins, and a compare and mux operation may be performed 8 times to steer a result to the appropriate orientation bin. However, the number of compare and mux operations may be reduced from 8 to 4, as described below.

For every input pixel, there are output values for two adjacent orientation bins, denoted o(k % K) and o((k+1)% K), where k is an integer from 0 to K−1 (i.e., the total number of orientation bins) and % is a modulo operator. One of the two orientation bins is even (i.e., represents an even gradient angle measure, such as 0, 90, 180, or 270 degrees) and another is odd (i.e., represents an odd gradient angle measure, such as 45, 135, 225, or 315 degrees). However, o(k) can be even or odd. If o(k) is odd, o(k+1) is even and vice versa. In some implementations, an odd/even detection is performed using a comparison operation, and a vector swap operation is used to store the even orientation bins in one vector register (w(2*i)) and to store odd orientation bins in another vector register (w(2*i+1)). The corresponding gradient magnitudes are also swapped. As a result, the even orientation bins can only be output to orientation position 0, 2, 4, or 6 (0, 90, 180, or 270 degrees), and the odd orientation bins can only be output to orientation position 1, 3, 5, or 7 (45, 135, 225, or 315 degrees). Thus, a number of potential orientation bins into which an output is steered is reduced from 8 to 4.

In a particular aspect, to compute an output, the inputs come from a 16×16 region (e.g., 2M/N×2M/N). The computation of (w(0), w(1), w(4), w(5)) is based on location x, while computation of (w(2), w(3), w(6), w(7)) is based on location x+1. To match the output format, (w(0), w(1), w(4), w(5)) are shifted to left by 4 (e.g., M/2N) and (w(2), w(3), w(6), w(7)) are shifted to right by 4 (e.g., M/2N). This adjustment enables vectorization to be performed and aligns the implicit address so that merging can be performed (e.g., accumulating contributions from multiple input pixels to a common output bin). This merging enables replication by 8 (e.g., M/N) instead of 16 (e.g., 2M/N) to avoid conflicts that may otherwise arise from multiple input pixel contributions being accumulated into the same output bin at the same time, thus reducing the number of registers used. FIG. 2 depicts a first example 202 depicting (w(0), w(1), w(4), w(5)), a second example 204 depicting (w(2), w(3), w(6), w(7)), and an example 206 of an output format before combining replicating bins.

In another particular aspect, the number of shifts is reduced by half. To illustrate, in the process of merging output values, only (w(2), w(3), w(6), w(7)) are shifted, and are shifted by 8 (e.g., M/N). The total number of merging operations can be up to 16 (e.g., 2M/N). Before writing the final output to memory, a left shift of 4 is performed to match the output format 206. In other words, an intermediate output format 208 in an inner processing loop is skewed, and final adjustment is done in an outer processing loop.

In a particular aspect, processing values for an output includes looping through all the inputs of the 16×16 region that can contribute to the output, avoiding address generation by using loop control (in the y axis) and shift (in the x axis). A number of computations are therefore reduced as compared to implementations in which output addresses are generated. In a particular implementation of using loop control in the y axis, a look-up table is used to detect the switch from "y+1" to "y", thus changing the weight and output computation. Through loop control, look-up table, shift, preprocessing and swap, the number of potential output bins is reduced from 32 to 4, enabling output processing that is competitive with or faster than using dedicated histogram circuitry.

In a particular aspect, out-of-bound output in the x-axis is handled by assigning a zero value, and out-of-bound output in the y-axis is controlled through the loop iteration.

Figure 3:
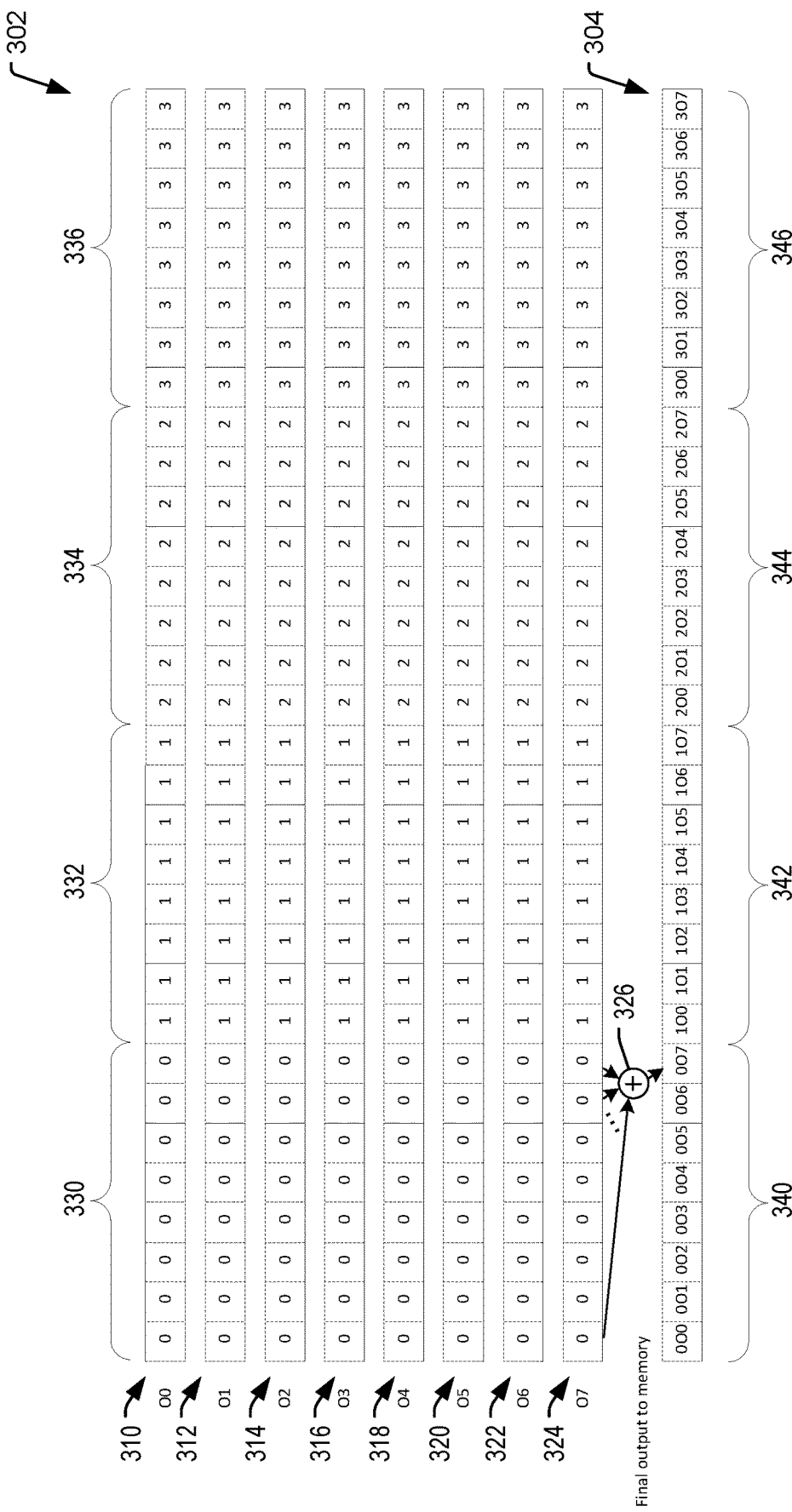
FIG. 3 is a diagram illustrating an example of replicated output bin merging that may be performed during generation of a feature descriptor.

As explained above, in a particular aspect conflicts are avoided by replicating one orientation bin 8 (e.g., M/N) times. In gathering the data from 16×16 inputs, 8-time replication of an orientation bin avoids conflicts when merging or combining the intermediate results using a mux operator. Merging is performed 16×2 times per output, and the 8 (e.g., M/N) same orientation bins are summed together before storing to memory. FIG. 3 depicts an example 302 that includes 8 replicated bins for each orientation bin (O0, . . . O7) of an output (e.g., 8 replicated bins for each bin of the histogram 194 of O[0,0]). A final output 304 to memory illustrates summing of the replicated output bins.

The example 302 includes replicated bins for a first orientation bin (O0) 310, replicated bins for a second orientation bin (O1) 312, replicated bins for a third orientation bin (O2) 314, replicated bins for a fourth orientation bin (O3) 316, replicated bins for a fifth orientation bin (O4) 318, replicated bins for a sixth orientation bin (O5) 320, replicated bins for a seventh orientation bin (O6) 322, and replicated bins for an eighth orientation bin (O7) 324. Replicated bins that correspond to a first output histogram 340 of a feature vector are labelled with a "0" value, replicated bins that correspond to a second output histogram 342 are labelled with a "1" value, replicated bins that correspond to a third output histogram 344 are labelled with a "2" value, and replicated bins that correspond to a fourth output histogram 346 are labelled with a "3" value.

To generate a value for a bin of the final output 304, the replicated values for that bin are summed. To illustrate, a representative adder 326 is configured to add the values in each of the replicated bins for the seventh orientation bin (O7) 324 of the first output histogram 340 to generate the final value of the seventh bin (0O7) of the first output histogram 340.

In a particular aspect, techniques described herein are performed using vectorization. The merging process is performed using conditional compare and mux operators to 1 of 4 potential bins without output address generation and therefore can be implemented using generic vector instructions without using specialized hardware (e.g., dedicated scatter or histogram circuitry).

In a non-limiting example, feature descriptor generation on a vector processor as described above is approximately 1.52 times faster than feature descriptor generation using a histogram solution and is approximately 1.8 times faster than using a scatter solution. These computations include gradient magnitude computation, gradient angle computation, and generating a SIFT descriptor vector.

In a non-limiting example, conflict is avoided in accordance with aspects described above, while a scatter solution has conflicts when multiple inputs update the same output address, and in a histogram solution conflicts are handled through replication in hardware design.

In a non-limiting example, an output that is a weighted combination of a 16×16 input that is to be merged or updated multiple times is updated on data stored at a register in accordance with aspects described above. Updating data stored at a register is one level closer to the processor as compared with updating data that is stored at a cache/VTCM, such as in a "scatter" implementation. Fewer registers are active (e.g., 8) in accordance with aspects described above as compared to histogram processing due to increased replication in the histogram design to avoid conflict.

In a non-limiting example, processing in accordance with aspects described above is performed using general vector instructions as compared to the specialized hardware used by other approaches.

Figure 4:
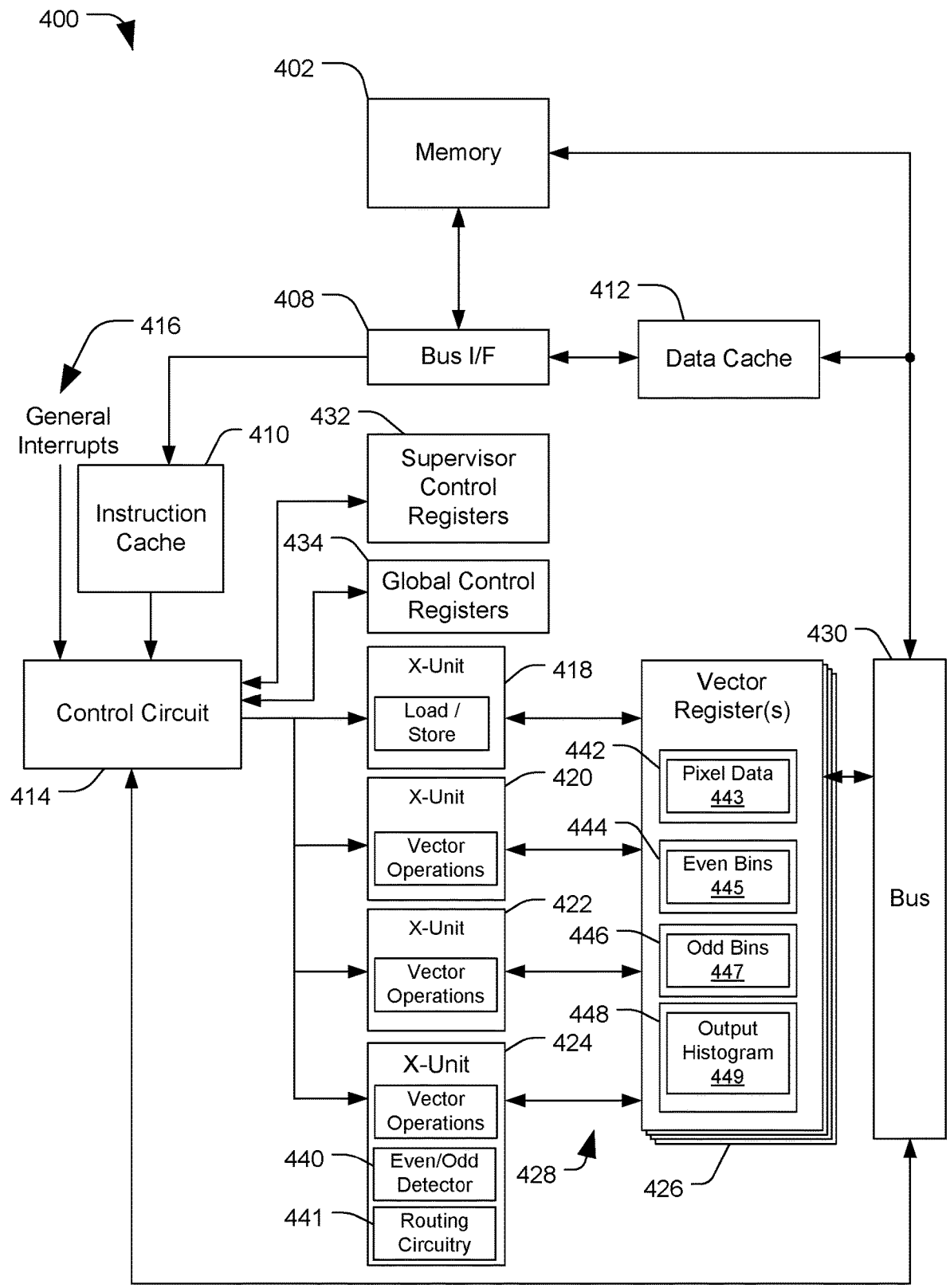
FIG. 4 is a block diagram of a particular implementation of a processor configured to perform feature descriptor processing.

FIG. 4 depicts an example of a processor 400 that may be used to generate feature descriptors in accordance with one or more of the above-described aspects. The processor 400 includes a control circuit 414 (also referred to as a "control unit") coupled to one or more execution units ("X-unit"), illustrated as a first execution unit 418, a second execution unit 420, a third execution unit 422, and a fourth execution unit 424. In a particular implementation, each of the execution units 418-424 includes vector arithmetic computation circuitry, such as an arithmetic logic unit (ALU); address computation circuitry, such as an address generation unit (AGU); floating-point computation circuitry, such as a floating-point unit (FPU); load-store circuitry, such as a load-store unit; other circuitry; or any combination thereof, to support vector processing operations. For example, the first execution unit 418 may include a load/store circuit to load and store vector data to vector registers 426 and may omit one or more computation components (e.g., FPUs) that are included in the other execution units 420-422. Although four execution units are illustrated, in other implementations fewer than four or more than four execution units may be included. Instructions may be executed in parallel at the execution units 418-424. For example, multiple vector processing instructions (e.g., load, store, add, merge, compare, etc.) may be executed in parallel via the four execution units 418-424.

The execution units 418-424 are coupled to the vector registers 426 via a bus 428. The vector registers 426 are coupled to a data cache 412 and a memory 402 via a bus 430. The data cache 412 and the memory 402 are coupled to an instruction cache 410 via a bus interface 408. The control circuit 414 is configured to receive instructions from the instruction cache 410 and is coupled to one or more control registers, such as supervisor control registers 432 and global control registers 434. The control circuit 414 is also responsive to one or more general interrupts 416.

In some aspects, the control circuit 414 is configured to load registers of the vector registers 426 with data of a group of pixels of an input image, such as from the memory 402 or the data cache 412. For example, the control circuit 414 may cause the first execution unit 418 to load pixel data 443 from the memory 402 or the data cache 412 to one or more vector registers 442. The group of pixels is selected in accordance with a particular iteration of an iterative feature descriptor operation. For example, the control circuit 414 may maintain or access one or more loop counters, such as an inner loop counter and an output loop counter, and may select groups of image pixels to load into the vector registers 426 for each of the output histograms of the feature descriptor. One or more of the execution units 418-424 is configured to perform vector processing of the data to determine first contributions to bins of an output histogram that is selected in accordance with the particular iteration. For example, one or more of the execution units 420, 422, or 424 may perform one or more vector operations to process, output, compare, and merge vector data in the vector registers 426, in accordance with one or more aspects described with reference to FIGS. 1-3.

For example, in a particular implementation, the fourth execution unit 424 is configured to process pixels of the pixel data 443 to generate two output values for each processed pixel. The fourth execution unit 424 includes an even/odd detector 440 that is configured to compare the first output value of each processed pixel to one or more ranges to determine whether the first output value corresponds to an "even" bin or to an "odd" bin. The fourth execution unit 424 is configured to selectively route the first output value to one or more vector registers 444 storing replicated values of one or more of the even bins 445 (e.g., the replicated bins for the first orientation bin (O0) 310 of FIG. 3) or to one or more vector registers 446 storing replicated values of one or more of the odd bins 447 (e.g., the replicated bins for the second orientation bin (O1) 312 of FIG. 3). After generating the output values for the pixel data 443, the fourth execution unit 424 merges and accumulates replicated bin values as described in FIG. 3 to generate an output histogram 449 in a vector register 448. The control circuit 414 causes the first execution unit 418 to store the output histogram 449 to the data cache 412, such as after generating the output histogram 449, upon detecting that the vector register 448 is full, or upon completing processing of pixel data in the region of a detected feature point, as illustrative, non-limiting examples.

Figure 5:
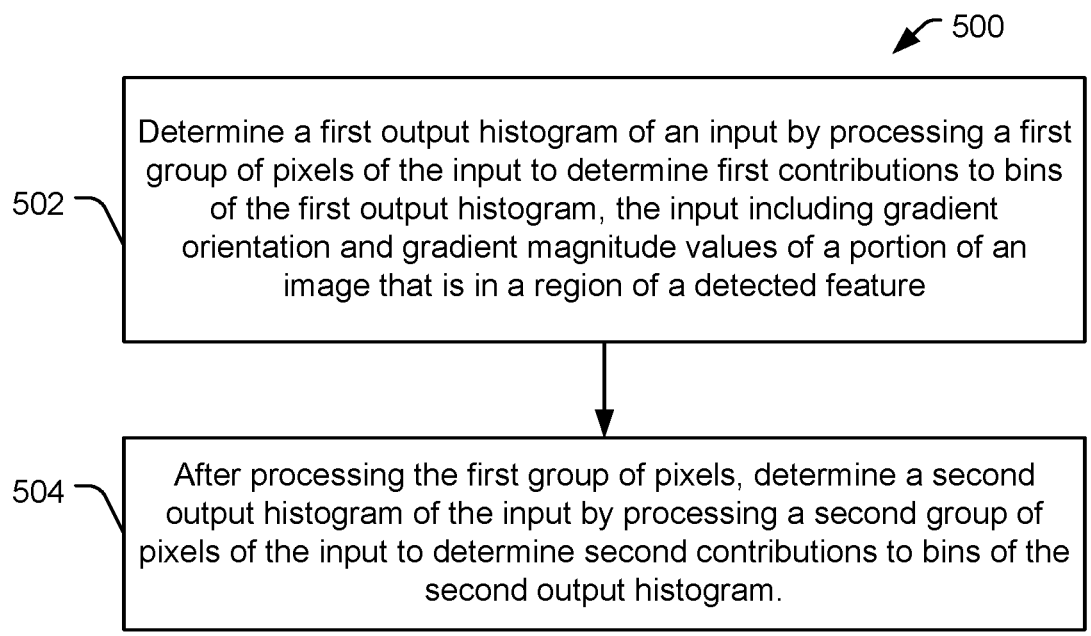
FIG. 5 is a flow chart of a particular implementation of a method of generating a feature descriptor.

FIG. 5 depicts an example of a method 500 of generating a feature descriptor. For example, the method 500 may be performed by the processor 400 of FIG. 4.

The method 500 includes determining a first output histogram of an input by processing a first group of pixels of the input to determine first contributions to bins of the first output histogram, at 502. The input includes gradient orientation values and gradient magnitude values of a portion of an image that is in a region of a detected feature. In an illustrative example, the first group of pixels corresponds to the 16×16 group including the input regions I[0,0], I[0,1], I[1,0], and I[1,1] that are processed to generate O[0,0] of FIG. 1. In a particular implementation, the control circuit 414 of FIG. 4 causes the first execution unit 418 to load pixel data 443 corresponding to the first group of pixels from the memory 402 or the data cache 412 to the one or more vector registers 442. The control circuit 414 also causes one or more of the execution units 420, 422, or 424 to process the pixel data 443 in the one or more vector registers 442 to generate values corresponding to the bins of the first output histogram and to write the generated values into the vector register 448.

After processing the first group of pixels, a second output histogram of the input is determined by processing a second group of pixels of the input to determine second contributions to bins of the second output histogram, at 504. In an illustrative example, the second group of pixels corresponds to the 16×16 group including the input regions I[0,1], I[0,2], I[1,1], and I[1,2] that are processed to generate O[0,1] of FIG. 1. In a particular implementation, the control circuit 414 of FIG. 4 causes the first execution unit 418 to load pixel data 443 corresponding to the second group of pixels from the memory 402 or the data cache 412 to the one or more vector registers 442. The control circuit 414 also causes one or more of the execution units 420, 422, or 424 to process the pixel data 443 in one or more the vector registers 426 to generate values corresponding to the bins of the second output histogram and to write the generated values into the vector register 448.

In a particular example, after processing the first group of pixels and the second group of pixels, the method 500 continues with processing the two remaining 16×16 groups of pixels along the top of the input 110 to generate O[0,2] and O[0,3] of FIG. 1, followed by processing groups of the input 110 to generate O[1,0], O[1,1], O[1,2], and O[1,3], followed by processing groups of the input 110 to generate O[2,0], O[2,1], O[2,2], and O[2,3], and followed by processing groups of the input 110 to generate O[3,0], O[3,1], O[3,2], and O[3,3]. Processing each group results in an 8-bin histogram for that group, and the sixteen 8-bin histograms are concatenated into a 128-bit feature descriptor.

In some implementations, the method 500 includes determining the first group of pixels by selecting pixels of the input that contribute to the bins of the first output histogram and determining the second group of pixels by selecting pixels of the input that contribute to the bins of the second output histogram. In an illustrative example, in the first iteration the output histogram 194 corresponding to O[0,0] of FIG. 1 is selected, and the first group of pixels is determined by selecting pixels of the input 110 that contribute to bins of the output histogram 194: the pixels of I[0,0], I[0,1], I[1,0], and I[1,1]. In the second iteration the output histogram corresponding to O[0,1] is selected, and the second group of pixels is determined by selecting pixels that contribute to the output histogram corresponding to O[0,1]: the pixels of I[0,1], I[0,2], I[1,1], and I[1,2].

In some implementations processing the first group of pixels is performed during a first iteration of an iterative feature descriptor operation and processing the second group of pixels is performed during a second iteration of the iterative feature descriptor operation. The method 500 may further include writing the first output histogram to a cache after updating the bins of the first output histogram during the first iteration, and writing the second output histogram to the cache after updating the bins of the second output histogram during the second iteration. In an illustrative example, during the first iteration, the pixels of I[0,0], I[0,1], I[1,0], and I[1,1] are processed to generate the output histogram of O[0,0], and during the second iteration, the pixels of I[0,1], I[0,2], I[1,1], and I[1,2] are processed to generate the output histogram of O[0,1]. The first output histogram is unmodified during the iterations of the iterative feature descriptor operation other than the first iteration (e.g., iterations 2-16). To illustrate, none of the pixels of the input 110 other than the pixels in I[0,0], I[0,1], I[1,0], and I[1,1] contribute to the output histogram 194. Therefore, the output histogram 194 may be written to the cache (e.g., the control circuit 414 causes the first execution unit 418 to write the output histogram 449 from the vector register 448 to the data cache 412 or a level-2 cache in the memory 402 of FIG. 4) at the end of the first iteration, or during a later iteration, without having to be retrieved later for updates from other pixels. Similarly, the second output histogram (e.g., O[0,1]) is unmodified during the iterations of the iterative feature descriptor other than the second iteration.

In some implementations, the method 500 includes selectively routing a first output value of a first pixel of the first group of pixels to one of a first vector register or a second vector register, based on application of even/odd detection to the first output value. In an illustrative example, bins 0, 2, 4, and 6 ("even" bins corresponding to "even" values) may correspond to gradient angles of 0 degrees, 90 degrees, 180 degrees, and 270 degrees, respectively, and bins 1, 3, 5, and 7 ("odd" bins corresponding to "odd" values) may correspond to gradient angles of 45 degrees, 135 degrees, 225 degrees, and 315 degrees, respectively. Based on an output of an even/odd detector, one of the outputs for a pixel (e.g., one of w(0) or w(1) for a pixel in I[0,0]) is routed to a first vector register storing values for even bins or to a second vector register storing values for odd bins. A second output value of the first pixel (e.g., the other of w(0) or w(1) for the pixel in I[0,0]) is selectively routed to the other of the first vector register or the second vector register. In an illustrative example, one or more of the execution units 420, 422, or 424 of FIG. 4 includes an even/odd detector 440 configured to detect whether a first output for a pixel corresponds to an even bin or an odd bin, and also includes routing circuitry 441 to route the first output to a first vector register of the one or more vector registers 444 or to a second vector register of the one or more vector registers 446 based on a result of the even/odd detector 440 and to route the second output for the pixel to the other of the first vector register or the second vector register.

In a particular implementation, selecting the first group of pixels as contributors to the first output histogram and selecting the second group of pixels as contributors to the second output histogram enables generation of a feature vector corresponding to the input using a reduced number of cache accesses as compared to processing the pixels of the input using a row-by-row processing order. To illustrate, as explained above, approximately 4,096 reads and 128 writes may be performed to a cache, by leveraging on vector registers as intermediate accumulator, using techniques described herein, as compared to approximately 1,024 reads and 8,192 writes using a "scatter" technique that may perform row-by-row pixel processing. The reduced number of cache accesses enables reduced latency due to data transfers between registers and the cache memory, and therefore enables reduced speed of feature vector computation.

Figure 6:
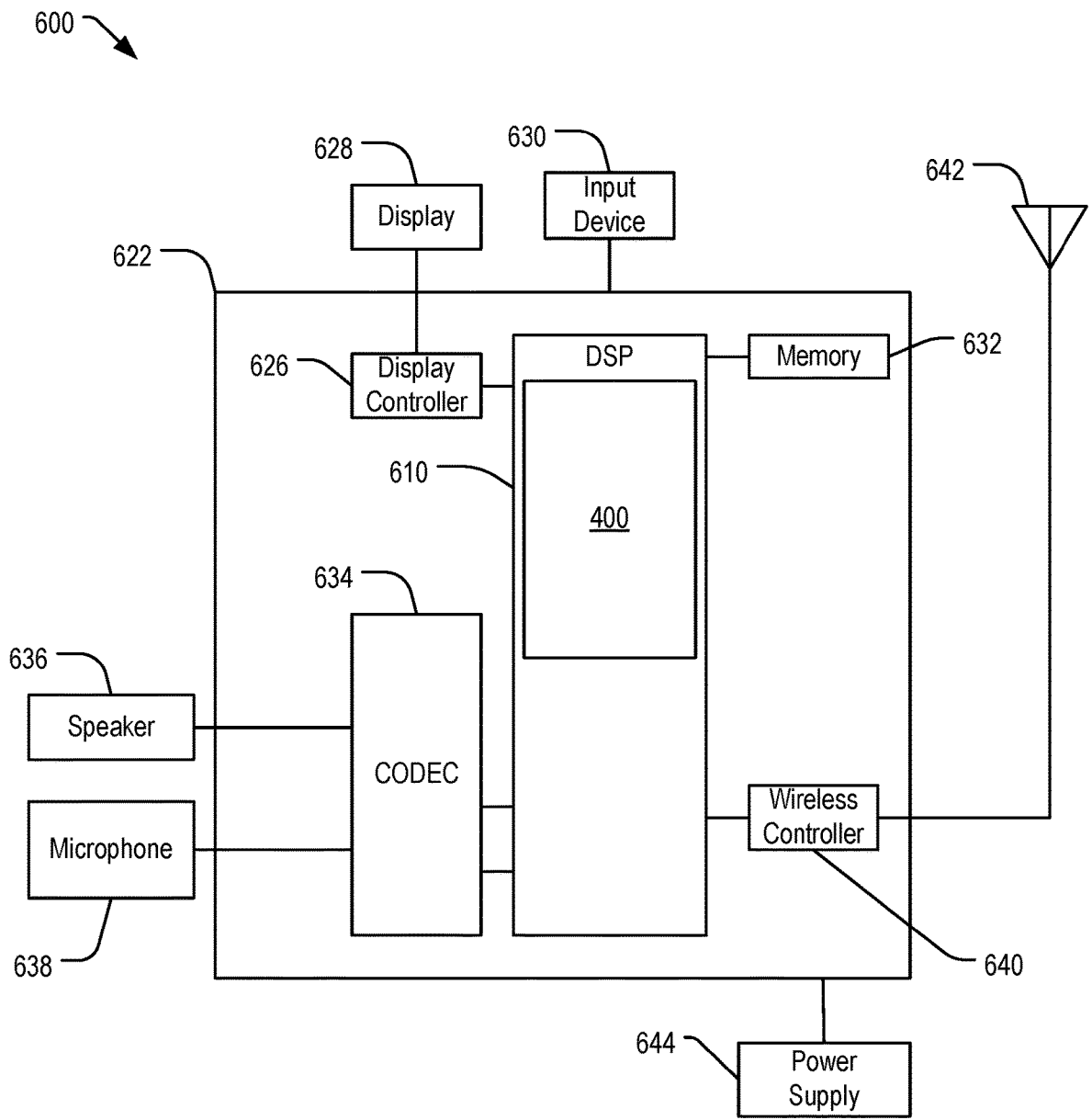
FIG. 6 is a block diagram of a portable device including a processor configured to generate a feature descriptor.

Referring to FIG. 6, a block diagram of a particular illustrative implementation of an electronic device including the processor 400 is depicted and generally designated 600. The electronic device 600 may correspond to a mobile device (e.g., a cellular telephone), as an illustrative example. In other implementations, the electronic device 600 may correspond to a computer (e.g., a server, a laptop computer, a tablet computer, or a desktop computer), a wearable electronic device (e.g., a personal camera, a head-mounted display, or a watch), a vehicle control system or console, a home appliance, a set top box, an entertainment unit, a navigation device, a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The device 600 includes a processor 610, such as a digital signal processor (DSP), coupled to a memory 632. In an illustrative example, the processor 610 is implemented using the processor 400 and is configured to generate feature descriptors in accordance with one or more of the above-described aspects, such as using vector instructions to process each tile of an array of (e.g., 16×16 pixel) tiles of an input (of gradient magnitude and gradient orientation data) to compute a set of output vectors for the tile.

The memory 632 may be coupled to or integrated within the processor 610. The memory 632 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another storage device, or a combination thereof. The memory 632 stores one or more instructions that are executable by the processor 610 to perform operations, such as the method 500 of FIG. 5.

FIG. 6 also shows a display controller 626 that is coupled to the processor 610 and to a display 628. A coder/decoder (CODEC) 634 can also be coupled to the processor 610. A speaker 636 and a microphone 638 can be coupled to the CODEC 634.

FIG. 6 also indicates that a wireless controller 640 can be coupled to the processor 610 and to an antenna 642. In a particular implementation, the processor 610, the display controller 626, the memory 632, the CODEC 634, and the wireless controller 640, are included in a system-in-package or system-on-chip device 622. In a particular implementation, an input device 630 (such as one or more cameras or image sensors that may be configured to perform image capture to generate the image 102 of FIG. 1) and a power supply 644 are coupled to the system-on-chip device 622. Moreover, in a particular implementation, as illustrated in FIG. 6, the display 628, the input device 630, the speaker 636, the microphone 638, the antenna 642, and the power supply 644 are external to the system-on-chip device 622. However, each of the display 628, the input device 630, the speaker 636, the microphone 638, the antenna 642, and the power supply 644 can be coupled to a component of the system-on-chip device 622, such as an interface or a controller.

The foregoing disclosed devices and functionalities, e.g., as described in reference to any one or more of FIGS. 1-6, may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

In connection with the disclosed examples, a non-transitory computer readable medium (e.g., the memory 632) stores at least one instruction that is executable by a processor (e.g., the processor 400 or the processor 610) to generate a feature descriptor in accordance with one or more of the above-described aspects. For example, in a particular aspect the memory 632 stores instructions to cause the processor 610 to perform the method 500 of FIG. 5.

In conjunction with the disclosed examples, an apparatus includes means for loading registers with data of a group of pixels of an input, the group of pixels selected in accordance with a particular iteration of an iterative feature descriptor operation. For example, the means for loading may correspond to the control circuit 414, the first execution unit 418 configured as a load/store unit, one or more other circuits or devices to load registers with image data as part of an iterative feature descriptor operation, or any combination thereof.

The apparatus also includes means for performing vector processing of the data to determine first contributions to bins of an output histogram that is selected in accordance with the particular iteration. For example, the means for performing vector processing may correspond to one or more of the execution units 420-424, one or more other circuits or devices to perform vector processing, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Portions of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A processor configured to generate a feature descriptor, the processor comprising:
   a control unit configured to load one or more registers with data of a group of pixels of an input, the group of pixels selected in accordance with a particular iteration of an iterative feature descriptor operation; and
   an execution unit configured to perform vector processing of the data to determine first contributions to bins of an output histogram that is selected in accordance with the particular iteration,
   wherein the output histogram is unmodified during other iterations of the iterative feature descriptor operation.

2. The processor of claim 1, wherein the group of pixels corresponds to pixels of a portion of an image, and wherein the data of the group of pixels includes gradient orientation values and gradient magnitude values.

3. The processor of claim 2, wherein the control unit is further configured to determine the group of pixels for the particular iteration by selecting pixels that contribute to the bins of the selected output histogram.

4. The processor of claim 1, further comprising:
   a register coupled to the execution unit and configured to store values of the output histogram; and
   a cache coupled to the register,
   wherein the control unit is further configured to write the output histogram from the register to the cache after updating the bins during the particular iteration.

5. The processor of claim 1, further comprising:
   a first vector register to store first values corresponding to even bins of the output histogram; and
   a second vector register to store second values corresponding to odd bins of the output histogram,
   wherein the execution unit is further configured to perform even/odd detection to selectively route a first output value of a first pixel of the group of pixels to one of the first vector register or the second vector register and to selectively route a second output value of the first pixel to the other of the first vector register or the second vector register.

6. The processor of claim 1, wherein selection of the group of pixels, by the control unit during each iteration of the iterative feature descriptor operation, as contributors to the output histogram of that iteration, enables generation of a feature vector using a reduced number of cache accesses, by accumulating partial outputs into vector registers instead of memory, as compared to processing the pixels of the input using a row-by-row processing order.

7. A method of generating a feature descriptor, the method comprising:
   determining, at a processor, a first output histogram of an input by processing a first group of pixels of the input to determine first contributions to bins of the first output histogram, the input including orientation values and gradient magnitude values of a portion of an image that is in a region of a detected feature;
   writing the first output histogram to a cache after updating the bins of the first output histogram during a first iteration of an iterative feature descriptor operation;
   after processing the first group of pixels, determining, at the processor, a second output histogram of the input by processing a second group of pixels of the input to determine second contributions to bins of the second output histogram; and
   writing the second output histogram to the cache after updating the bins of the second output histogram during a second iteration of the iterative feature descriptor operation.

8. The method of claim 7, further comprising:
   determining the first group of pixels by selecting pixels of the input that contribute to the bins of the first output histogram; and
   determining the second group of pixels by selecting pixels of the input that contribute to the bins of the second output histogram.

9. The method of claim 7, wherein processing the first group of pixels is performed during the first iteration of the iterative feature descriptor operation and processing the second group of pixels is performed during the second iteration of the iterative feature descriptor operation.

10. The method of claim 7, wherein the first output histogram is unmodified during iterations of the iterative feature descriptor operation other than the first iteration, and wherein the second output histogram is unmodified during iterations of the iterative feature descriptor other than the second iteration.

11. The method of claim 7, further comprising:
    selectively routing a first output value of a first pixel of the first group of pixels to one of a first vector register or a second vector register, based on application of even/odd detection to the first output value; and
    selectively routing a second output value of the first pixel to the other of the first vector register or the second vector register.

12. The method of claim 7, wherein selecting the first group of pixels as contributors to the first output histogram and selecting the second group of pixels as contributors to the second output histogram enables generation of a feature vector corresponding to the input using a reduced number of cache accesses as compared to processing the pixels of the input using a row-by-row processing order.

13. A non-transitory computer readable medium comprising at least one instruction, the at least one instruction, when executed by a processor, causing the processor to perform operations comprising:
    determining a first output histogram of an input by processing a first group of pixels of the input to determine first contributions to bins of the first output histogram, the input including orientation and gradient magnitude values of a portion of an image that is in a region of a detected feature;
    writing the first output histogram to a cache after updating the bins of the first output histogram during a first iteration of an iterative feature descriptor operation;
    after processing the first group of pixels, determining a second output histogram of the input by processing a second group of pixels of the input to determine second contributions to bins of the second output histogram; and
    writing the second output histogram to the cache after updating the bins of the second output histogram during a second iteration of the iterative feature descriptor operation.

14. The computer readable medium of claim 13, the operations further comprising:
    determining the first group of pixels by selecting pixels of the input that contribute to the bins of the first output histogram; and
    determining the second group of pixels by selecting pixels of the input that contribute to the bins of the second output histogram.

15. The computer readable medium of claim 13, wherein processing the first group of pixels is performed during the first iteration of the iterative feature descriptor operation and processing the second group of pixels is performed during second iteration of the iterative feature descriptor operation.

16. The computer readable medium of claim 13, wherein the first output histogram is unmodified during iterations of the iterative feature descriptor operation other than the first iteration, and wherein the second output histogram is unmodified during iterations of the iterative feature descriptor other than the second iteration.

17. The computer readable medium of claim 13, the operations further comprising:
   selectively routing a first output value of a first pixel of the first group of pixels to one of a first vector register or a second vector register, based on application of even/odd detection to the first output value; and
   selectively routing a second output value of the first pixel to the other of the first vector register or the second vector register.

18. An apparatus comprising:
   means for loading registers with data of a group of pixels of an input, the group of pixels selected in accordance with a particular iteration of an iterative feature descriptor operation;
   means for performing vector processing of the data to determine first contributions to bins of an output histogram that is selected in accordance with the particular iterations;
   first means for storing first values corresponding to even bins of the output histogram; and
   second means for storing second values corresponding to odd bins of the output histogram,
   wherein the means for performing vector processing is further configured to perform even/odd detection to selectively route a first output value of a first pixel of the group of pixels to one of the first means for storing or the second means for storing and to selectively route a second output value of the first pixel to the other of the first means for storing or the second means for storing.

19. The apparatus of claim 18, wherein the output histogram is unmodified during other iterations of the iterative feature descriptor operation.

20. The apparatus of claim 18, wherein the group of pixels corresponds to pixels of a portion of an image, and wherein the data of the group of pixels includes gradient orientation values and gradient magnitude values.

* * * * *